United States Patent
Rombouts

(10) Patent No.: US 10,396,555 B2
(45) Date of Patent: Aug. 27, 2019

(54) SELF-LEARNING, REAL-TIME, DATA-DRIVEN POWER METERING SYSTEM

(71) Applicant: REstore NV, Berchem (BE)

(72) Inventor: Jan-Willem Rombouts, Antwerp (BE)

(73) Assignee: REstore NV, Antwerp (BE)

( * ) Notice: Subject to any disclaimer, the term of this patent is extended or adjusted under 35 U.S.C. 154(b) by 182 days.

(21) Appl. No.: 15/606,526

(22) Filed: May 26, 2017

(65) Prior Publication Data
US 2017/0264095 A1    Sep. 14, 2017

Related U.S. Application Data

(63) Continuation of application No. 15/043,006, filed on Feb. 12, 2016, now Pat. No. 9,705,327.

(60) Provisional application No. 62/192,528, filed on Jul. 14, 2015.

(51) Int. Cl.
| | | |
|---|---|---|
| *H02J 3/00* | (2006.01) | |
| *G05B 17/02* | (2006.01) | |
| *G06Q 10/04* | (2012.01) | |
| *G06Q 50/06* | (2012.01) | |

(52) U.S. Cl.
CPC ............... *H02J 3/00* (2013.01); *G05B 17/02* (2013.01); *G06Q 10/04* (2013.01); *G06Q 50/06* (2013.01); *Y02P 80/11* (2015.11)

(58) Field of Classification Search
CPC ........ G05B 17/02; G06Q 10/04; G06Q 50/06; H02J 3/00
See application file for complete search history.

(56) References Cited

U.S. PATENT DOCUMENTS

| | | |
|---|---|---|
| 4,858,141 A | 8/1989 | Hart et al. |
| 6,937,946 B1 | 8/2005 | Culp et al. |
| 8,370,093 B1 | 2/2013 | Adams |
| (Continued) | | |

FOREIGN PATENT DOCUMENTS

WO    2013/011425    1/2013

OTHER PUBLICATIONS

Ruzzelli et al. "Real-Time Recognition and Profiling of Appliances through a Single Electricity Sensor" from "IEEE Secon 2010 proceedings" (Year: 2010).*

(Continued)

*Primary Examiner* — Yuhui R Pan
(74) *Attorney, Agent, or Firm* — Beyer Law Group LLP

(57) ABSTRACT

A power metering system includes any number of sites and a central database. Loads within a site are unmetered and a sensor data vector over time includes sensor data, operational data and external data. Iteration occurs over time intervals for all unmetered loads and the unmeasured power for each interval is disaggregated by matching a load type with a computer model in the central database having the same feature domain in order to predict the power usage of each load. Iteration again occurs over those intervals in which only a single load is operating; the power of that load is determined to be the unmeasured power minus miscellaneous power, and a new computer model is fitted for that single load and also uploaded to the database. The feature domain of an existing model may also be increased. Both iteration steps repeat until no more unmeasured power can be disaggregated.

11 Claims, 10 Drawing Sheets

Power Metering System

(56) References Cited

U.S. PATENT DOCUMENTS

| | | |
|---|---|---|
| 2009/0228726 A1 | 9/2009 | Malik et al. |
| 2011/0046904 A1 | 2/2011 | Souilmi |
| 2013/0110621 A1 | 5/2013 | Gupta |
| 2013/0238266 A1* | 9/2013 | Sawides ................. G06Q 50/06 702/61 |

OTHER PUBLICATIONS

A. Zoha et al., Acoustic and Device Feature Fusion for Load Recognition, Melbourne, Australia, Sep. 6, 2012.
Y. Kim et al., Challenges in Resource Monitoring for Residential Spaces, Los Angeles, CA, pp. 1-6, Nov. 3, 2009.
S. Clark et al., Deltaflow: Submetering by Synthesizing Uncalibrated Pulse Sensor Streams, Ann Arbor, MI, Jun. 11, 2014.
T. Lovett et al., Designing Sensor Sets for Capturing Energy Events in Buildings, Bath, UK, pp. 229-230, Jun. 13, 2014.
M. Bergés et al., Leveraging Data from Environmental Sensors to Enhance Electrical Load Disaggregation Algorithms, Pittsburgh, PA, 2010.
E. Elhamifar et al., Energy Disaggregation via Learning 'Powerlets' and Sparse Coding, University of California, Berkely, Association for the Advancement of Artificial Intelligence, Jan. 25, 2015.
H. Kim et al., Unsupervised Disaggregation of Low Frequency Power Measurements, pp. 747-758, May 22, 2012.
Parson et al. "Non-intrusive load monitoring using prior models of general appliance types "Twenty-Sixth Conference on Artificaial Itelligence (AAAI-12).

* cited by examiner

| Load Type | Load Characteristics | System Parameters | Model | |
|---|---|---|---|---|
| Screw Compressor, Type "X" <br> 460 | Maximum Capacity: ___ | Cold Loss: ___ | Model A | Features: current <br> Domain: 10,000 to 20,000 Amps |
| Arc Furnace, Type "Y" <br> 462 | Efficiency: 70% | | Model B | Features: current, temperature <br> Domain: 20,000 Amps and greater |
| | Efficiency: 90% | | Model C | Features: temperature <br> Domain: Any |
| | | | Model D | Features: temperature <br> Domain: Any |
| ● ● ● <br> 410 | ● ● ● <br> 420 | ● ● ● <br> 430 | ● ● ● <br> 442 | ● ● ● <br> 444 |

400

Global Model Database

*FIG. 3*

Status Vector

Factory Data Vector

SELF-LEARNING, REAL-TIME, DATA-DRIVEN POWER METERING SYSTEM

CROSS REFERENCE TO RELATED APPLICATIONS

This application is a continuation of application Ser. No. 15/043,006, filed on Feb. 12, 2016, which in turn claims the benefit of priority under U.S.C. § 119(e) to U.S. provisional patent application No. 62/192,528, filed Jul. 14, 2015, entitled "Real-Time Data-Driven Industrial Power Metering and Cost Estimation System," which is hereby incorporated by reference.

FIELD OF THE INVENTION

The present invention relates generally to energy management. More specifically, the present invention relates to power disaggregation of loads within a site and estimation of their power usage without the use of a meter on each load.

BACKGROUND OF THE INVENTION

Industrial and residential power consumers are increasingly looking for ways to address the following needs: the need for cost saving through active management of power consumption (this typically includes strategies to save money by changing when and how energy is consumed); the need for compliance with industry or national standards which can unlock subsidies or fit within corporate social responsibility (CSR) policies of companies; and the need (for industrial consumers) for increased transparency on energy cost and its drivers to increase quality of internal financial reporting.

In order to address abovementioned needs for a residential consumer or company with industrial activities, one of the first steps is often to make the energy consumption of various power consuming devices ("loads") present at the industrial site or house more transparent to the consumer or to factory management and operators, and to detail the actual costs at a load or process level, rather than site level. This makes it easier to identify which loads are using most energy and which trends are present in their power consumption, and to perform a variety of analysis on the data.

In many factories and residences today, however, the only reliable metering data is delivered by the utility supplying the power, and only (i) at the level of the total industrial site, often times (ii) no more frequently than on a month-by-month basis, and often times (iii) only on a quarter-hourly or half-hourly basis. Such limited information typically does not lend itself well for industrial power consumers to perform analysis on the power consumption of loads resulting in actionable conclusions.

A traditional approach to better address the abovementioned needs is to install energy (or power) meters at one or more loads on site, log the metering values to a database and also to link this to a visualization tool that allows analysis of the energy consumption of the various loads. The installation of such power metering, however, can be expensive and operationally complex, given the hardware needed, installation, and visualization software costs.

Numerous prior art techniques have been proposed, some with varying levels of success, but all unable to accurately output in real time the power usage of individual loads within a site, without the use of an individual power meter on each load.

Accordingly, there is a need for techniques and apparatus to provide better transparency into the power consumption of loads within an industrial site.

SUMMARY OF THE INVENTION

To achieve the foregoing, and in accordance with the purpose of the present invention, a power metering system is disclosed that allows power to be disaggregated at a residential or industrial site.

It is realized that the usage of individual power meters is often times unnecessary as the site owner may be more interested in what are the drivers of power costs and usage rather than the precise power usage data that the power meters can supply. In fact, an approximation of power usage of a load may be acceptable rather than the precise usage data. For example, consider one machine of a given process that is the driver of cost increases over time as its energy efficiency goes down and it starts to consume more for same output. By performing disaggregation and outputting the power used by this machine, one can identify this machine as a driver of costs and can then perform maintenance or replace it to save costs. Or, consider a set of very high power machines, which are only occasionally run. If run at the same time, maximum power consumption goes up at that time. Since the grid operator often calculates its tariff based upon this peak, one could be heavily penalized. In such a case, one may monitor the power consumption of a site using the present invention, as well as the consumption of these machines, as they drive the grid tariffs (or "peak penalties"). This monitoring may lead to a "peak shaving" strategy (i.e., not running the machines simultaneously).

And, it is realized that site owners need real-time feedback on power consumption, rather than monthly feedback. The present invention provides real-time data on individual load power consumption thus providing transparency to these loads and indicating the drivers of power consumption within a residential or an industrial site, all at a fraction of the cost of installing and maintaining power meters on all individual loads. The data provided is accurate enough to identify the main drivers, and can be derived using load status history and sensor data including internal sensor data, external sensor data and operational planning data.

Even for site that already has a number of power meters installed on certain loads or processes, the present invention has advantages. Those loads with meters provide data on measured power usage within the site, helping to disaggregate the unmeasured power for loads without meters. The invention can then identify those unmetered loads for which an addition of a power meter would be cost effective and where sensors should be added, while providing real-time power data for those loads for which installation of a meter would be too expensive. Thus, the invention identifies where within a site one should minimally add power meters or sensors (and at which times) so that the entire target load list can be virtually measured.

BRIEF DESCRIPTION OF THE DRAWINGS

The invention, together with further advantages thereof, may best be understood by reference to the following description taken in conjunction with the accompanying drawings.

FIG. 3 illustrates an example of a global model database stored at the computing unit in a database.

FIG. 6B is a flow diagram describing a second technique by which unmeasured power is further disaggregated by identifying loads that are on when no other loads are on.

DETAILED DESCRIPTION OF THE INVENTION

The present invention provides cost-efficient, low-threshold transparency of the power/energy consumption and costs of individual loads on a more real-time basis than what is typically available in a residential or industrial environment. This is done by optimally using all the available data at the site (both on- and off-line) to estimate individual energy consumption of machinery or processes that are of interest. Indeed, while individual energy measurements at a given load/process level may not be present, in many cases there is a rich set of sensor data (process temperatures, pressure, current, etc.), other power meters (including the site meter), and external sensor data (e.g., outside temperature) which can be used intelligently to infer the power consumption of the loads of interest.

The present invention disaggregates power consumption at residential or industrial sites by continuously adding and training models that predict power as a function of sensor data (in accordance with desired disaggregation accuracy). These models give real-time transparency on power usage and cost through an iterative algorithm that unlocks the relationships between the individual load power and sensor data in a step-by-step fashion.

For example, consider a site where ten machines (loads) are running, whose power is not measured. Assume, though, that if the machines run, that they each run at a constant power level (and that this level is known for each machine). If then there is frequent (and accurate) logging of the individual load states (ON/OFF), then it is trivial to obtain the individual load energy measurements, namely by multiplying the status of each load by its constant power level. This provides the simplest illustration of where it is unnecessary to install costly metering equipment when the energy used can simply be inferred (or calculated) from real-time sensor data (e.g., the ON/OFF states).

Another example is a set of loads whose power consumption is not constant, but well known as a function of time (i.e., the power profile may be deterministic when the loads are switched on, such as a maximum capacity minus an exponential decay with a decay factor), or whose power consumption is a deterministic function of a given sensor data point (i.e., current in a resistor, pressure in a system).

Thus, the present invention has general application to residential or industrial sites where real-time sensor data are available.

It is important to note that as such relationships concerning power consumption are drawn for loads and processes at an individual site level, these relationships can be used again at other sites with similar loads or processes. The methods presented have a central learning component, so as to maximize the overall self-learning capability of the system.

Power Metering System

Figure 1:
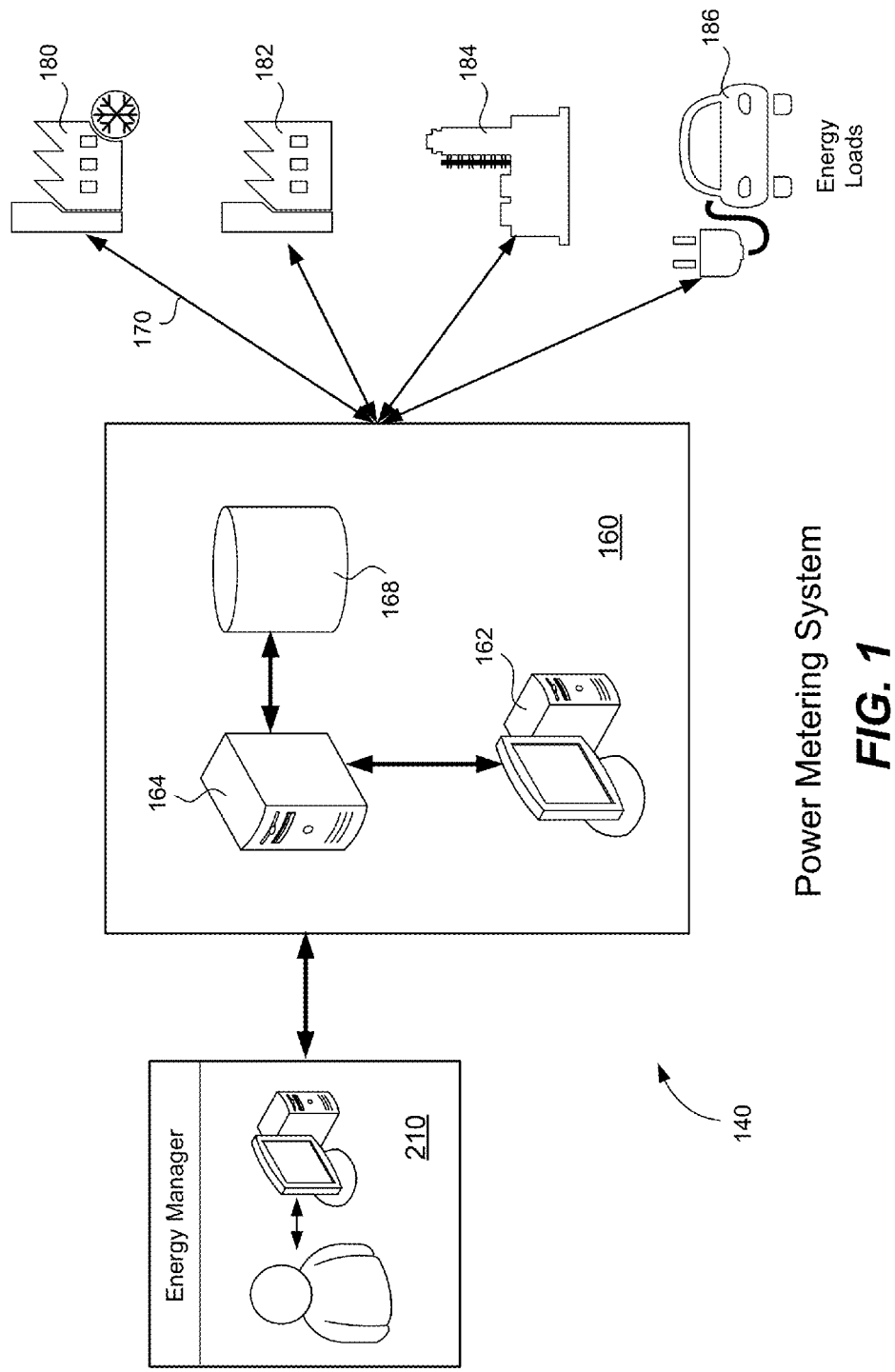
FIG. 1 is a block diagram illustrating one embodiment of a power metering system.

FIG. 1 is a block diagram illustrating one embodiment of a power metering system 140. Shown is a computing unit 160 in communication with an energy manager 210 and any number of industrial sites 180-186. Computing unit 160 includes a user interface computer 162, computer servers 164 and a database 168, and is preferably cloud-based, although other schemes are contemplated such as servers in a co-located data center, a dedicated server infrastructure, personal computers, or a distributed environment. In one embodiment, computing unit 160 and a power metering service is managed by Restore N.V. of Belgium and the unit is a set of dedicated servers in a co-located data center. In one embodiment, interface computer 162 (or computers): manages the system 140 and provides an interface to computers 164 and to sites 180-186; coordinates communication with the manager 210 and with the sites; and generally provides a front end to the computing unit. Unit 160 may also be located within one of the industrial sites, as may energy manager 210. In fact, it is contemplated that typically manger 210 will be in one of the factories. He or she will connect via a Web browser to the power metering service of REstore (shown as unit 160 running in the cloud), while the loads of interest are in the same site where he is located. There is also a connection from the cloud to those machines around him as shown.

Industrial sites 180-186 may be sites such as factories, data centers, pumped-storage hydroelectric plants, food processing facilities, breweries, micro-production units, etc., that each includes multiple electrical loads. Note that site 186 is an example of a site in which there is only a single electrical load. These industrial sites can connect to the electricity grid from different geographical locations, and are typically part of separate industrial corporations. In addition, a site may also be a residential site as explained below with reference to FIG. 9. Energy manager 210 is an individual who is responsible for energy usage within a site, such as a site owner (or the residential consumer), or dedicated factory energy manager, and may communicate with computing unit 160 via the Internet or other network.

Computer 162 is any suitable computer (such as a laptop or desktop computer) used by an individual to manage system 140. Any data may be stored within database (or databases) 168. An algorithm engine executes upon computer server 164 (or servers) in order to perform the techniques described herein. Computing unit 160 has a connection to a communication network 170 with which it communicates with all of the various industrial sites. Communication can be done through a secure Internet connection, dedicated communication lines, or any wireless communication network allowing secure connections.

Industrial Site Example

Figure 2:
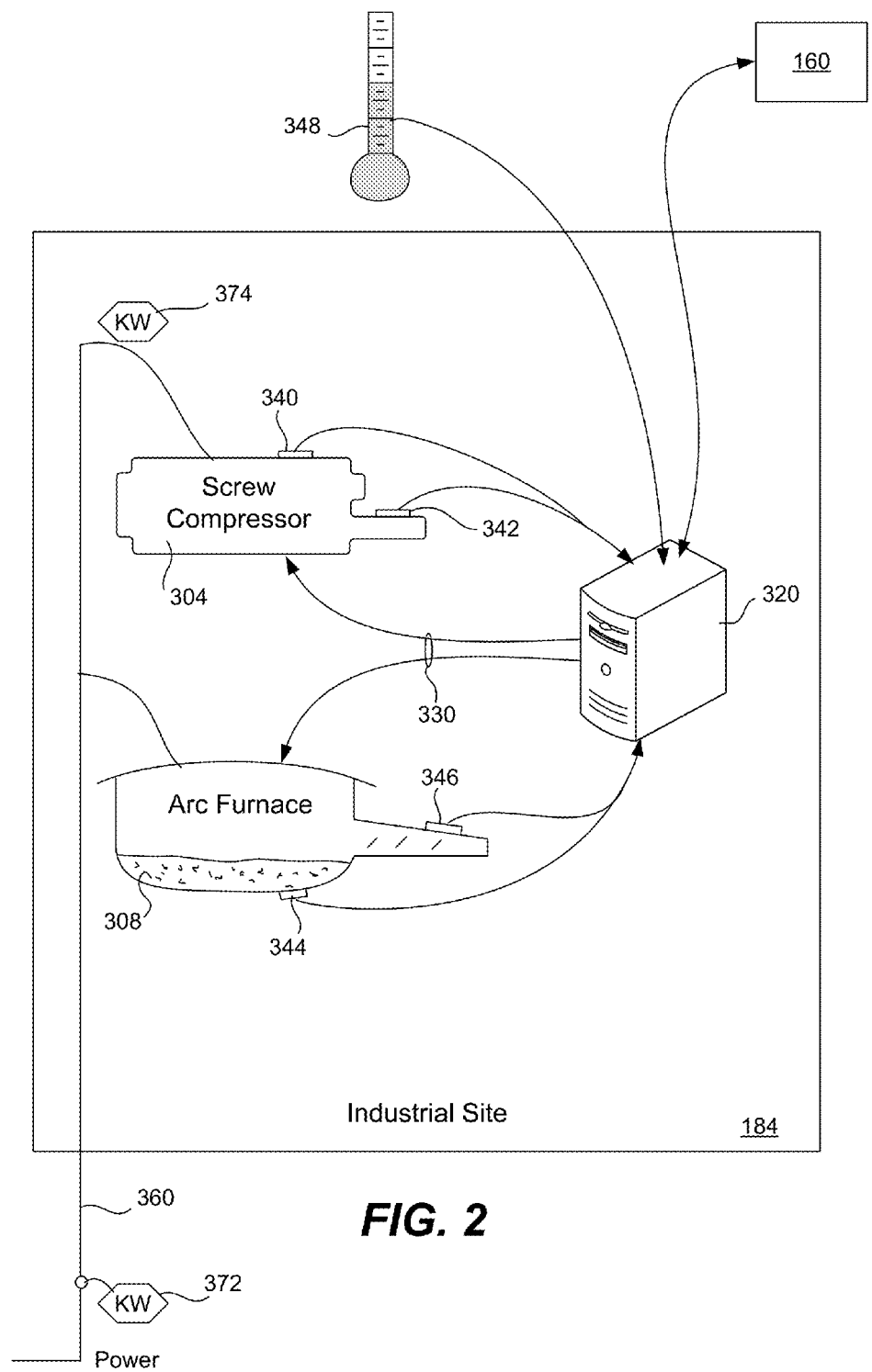
FIG. 2 illustrates an example industrial site according to one embodiment of the invention.

FIG. 2 illustrates an example of an industrial site 184 that implements the power metering system of the present invention. Included within this example site are any number of electrical loads, such as two electrical loads 304 and 308, and computer or computers 320. Power 360 is obtained from (or delivered to) a local distribution grid that supplies the power to residential, business and industrial consumers of electricity, which power in turn is received from a transmission grid that transmits electricity over long distances.

As shown, computer 320 couples to a local control system 330 that controls each load, such as a process automation system or a SCADA system. Any number of sensors 340-346 sense a variety of data (e.g., temperature, pressure, current, production volumes, stock levels) with respect to an industrial process comprising various loads within the site. A variety of data external to the site (e.g., external temperature 348, wind speed, luminosity, etc.) may also be captured by computer 320. The local control systems often store such sensor data, while any external data can be obtained through other means (e.g., public local temperature readings). Moreover, much of the sensor data is logged in real time and can be accessed over standard protocols (e.g., industrial bus, digital I/O), which allows collection in a central database 168 of such data of different factories. Importantly, the control system 330 also stores the ON/OFF status of most all machines and processes within a site.

Examples of an electrical load include: cold stores, ovens and other thermal loads, pulp grinders, stone grinders, compressors, furnaces, industrial electrolysis machinery, HVAC equipment, paper processing equipment, material handling equipment, oil and gas pumping systems, electric vehicle charging networks, agriculture equipment, etc. Each load is typically an autonomous machine or set of machines in an industrial site and is often connected to and is part of an industrial process. In fact, a particular industrial process may consist of any number of loads and be referred to itself as being a load.

Computer 320 may include a local gateway computer, an industrial personal computer or embedded device that facilitates communication with computing unit 160, which stores and manages data, and which contains software enabling local intelligence. A site power meter 372 measures the power used by the entire residential or industrial site and all of its loads, and may also measure power produced by the site. Although not strictly necessary, one or more loads within a site may include (or have added) a local power meter (such as power meter 374) in order to reduce the disaggregation error as explained below. Preferably, the present invention obviates the need for additional power meters on the electrical loads and is able to disaggregate the power used by the site without the use of local power meters. In fact, the invention can work without any power meters on loads, if sufficient models exist to provide power disaggregation based on other sensor data logged at the site.

Global Model Database

FIG. 3 illustrates an example of a global model database 400 stored at the computing unit in database 168, for example. As mentioned, the present invention keeps track of particular models that accurately predict power consumption of certain loads within a certain feature domain. Because it is common for certain types of loads to be used in many industrial sites, and because a certain type of load will generally use the same amount of power in similar circumstances, the present invention advantageously stores load types and associated models in a central database that may be used to predict the power at a variety of sites. For instance, storing this information at the central computing unit 160 allows any of sites 180-186 to make use of an applicable model for use in disaggregating power. Database 400 is an example; other load types and models may be present initially, other load types and models may be added, and feature domains may be changed.

As shown, database 400 includes load types in column 410, and for each load type are stored load characteristics 420 (such as machine model, maximum capacity, efficiency rating, production rate, age), and system parameters 430 (such as cold loss of a cold store to which a compressor is coupled, size and typical content of a cold store, etc.). For each load type it is possible that more than one model may be applicable depending upon these characteristics and parameters.

The models are specified in column 440 together with (i) a map of characteristics of the load to the model parameters, (ii) the features used by the model, and (iii) the feature domain on which the model's performance complies with the performance requirements set by the residential consumer, industrial user or by the operator of computing unit 160. Specifically, column 442 lists the specific mathematical model applicable to load type and column 444 lists the features used by the model and the applicable domain. The map of characteristics is a catalog of loads for which there is a model for their power prediction. The catalog parameterizes/labels the loads based upon their basic characteristics (e.g., "screw compressor of 250 KW, producing "XXX" liquefied gas," "pulp grinder of 4 MW of type ABC for wood types X, Y and Z"). Those labels then map to a set of model parameters (e.g., the coefficients "a, b" of a linear regression: Power_load=a×Pressure_SensorA1+b×Current_SensorB1).

For example, it is known that there are two mathematical models, A and B, which accurately predict the power consumption of a screw compressor of type X. In this simple example, model A uses the feature of current of the load and accurately predicts power consumption when the feature domain is between 10,000 and 20,000 amps, while model B accurately predicts power when amps are 20,000 and greater, but uses the features of current and temperature. Thus, as the domain changes for a particular load, it is possible that not only will a different model be required, but also that different features are used, perhaps due to non-linearity of the power response.

In another example, there are two mathematical models, C and D, which accurately predict power consumption of an arc furnace of type Y. Both models use the feature of furnace temperature to predict power, and are applicable to any temperature range. The load characteristics of this particular furnace indicate a specific model, however; model C accurately predicts power for an arc furnace with 70% efficiency, while model D accurately predicts power for an arc furnace with 90% efficiency.

It is also possible that the system parameters 430 may also dictate which model is best. For example, assume compressors AA and BB, both having the same load characteristics. Compressor AA is coupled to a "cool room" for vegetables, where the doors of the cooling room are frequently opened for taking out/adding vegetables, creating a very volatile temperature measurement. Compressor BB is coupled to the cold store of a logistics company which has buffer rooms around the store where they keep food at frozen temperatures, so that the temperature is much less volatile. In this case, the system characteristics will favor different models: models very well suited for volatile profiles will be preferred over others for compressor AA.

As is known in the art, features refer to any of the logged data within the factory vector (discussed below) that are used by a model to predict power. Also as is known in the art, a power model of a load provides a mathematical description of a load's system dynamics in order to mimic the dynamics of the load and is implemented through a computer program. A model uses as input parameters (i.e., features) and their possible values. The model helps answer the basic question, "when a parameter value is changed, how does that affect the power used by the load?" Models may be created in various ways as known to those of skill in the art. One technique is to rely upon historical data of the load and develop a "black box" that takes the parameters as input and produces the power required as output (using, for example, self learning such as neural network techniques). Such a black box model can typically be used for different types of loads. Another technique is to look at the basic physics of the load, i.e., first principles, and develop formulas using differential equations (for example) that may be solved to produce the model's output. A preferred technique for selecting a model for a particular load type is described in more detail below.

A distinction can be made between a locally-produced model that is fit at a particular industrial site, and a global or meta-model that is uploaded and stored in database 400. While all are models, not every local model will be uploaded to database 400 to be used elsewhere. Nevertheless, it is contemplated that most all models that are fit and meet the precision requirements will be uploaded and become a global model. As will be discussed in greater detail below, the central computing unit gathers and stores these global models for use by later similar load types at the same or different industrial sites during the course of disaggregating power at an industrial site. In particular, the below flow diagrams may result in the addition of information to database 400 such as new models or an increased feature domain for a current model. Use of the information in database 400 allows the power metering system to learn globally-applicable relationships between sensor data and power consumption of loads.

Logged Data, Status and Sensor Data Vectors

A variety of data is available, monitored and logged in real time at the residential or industrial site using sensors. Preferably, all values are logged in a sufficiently synchronous fashion and these values may be related to the power consumption of the loads directly or indirectly coupled to the load or process. Real-time site power (or a sufficient proxy for this power) is logged using power meter 372. Status signals (e.g., ON/OFF), or a sufficient proxy, are logged for the loads which are part of the production process in real time. This status information is used below and is denoted by a vector $\Lambda_{status}(t)$ which has a length equal to the number of loads. We denote logged sensor data and process set-point data $\Lambda_{sensor}(t)$, operational planning data $\Lambda_{ops}(t)$ and external sensor data $\Lambda_{sxt}(t)$, and the concatenation of these data vectors constitutes the "sensor data" vector $\Lambda(t)$. Concerning the logged sensor data and process set-point data, in many processes the process automation system uses set points (e.g., temperature, pressure) to control the individual load's part of the process. A feedback loop is often implemented based on the actual measured data (e.g., measured temperature, pressure).

Figure 4:
FIG. 4 is a graphical example of a status vector over time for a given industrial site.

FIG. 4 is a graphical example 500 of a status vector over time for a given industrial site. Such a status vector may be determined and logged using a control system and computers of a site as discussed above. In this simple example there are six loads of the site and the status vector shows only six time intervals out of continuous operation of the site. And, as will be described in greater detail below, individual loads that behave similarly may be grouped together and considered as a single load for purposes of the status vector and disaggregation of power. The time intervals may be measured every few seconds up to a few minutes, and may also represent longer periods of time, depending upon the site and the needs of the energy manager. As shown, during a first time interval 510, two of the loads are operating. In a second time interval 520, only load 4 is operating, and in a third time interval 530 loads 2-4 are operating while the other loads are off, etc. The status of each load is logged in real time, and during analysis as described below, the present invention may toggle the status of the load from ON to OFF in a row of the status vector to indicate that the power consumed (or produced) by that load has been disaggregated from the current unmeasured power.

Figure 5:
FIG. 5 is an example of a factory vector in which a variety of data concerning the industrial site and all of its loads is logged in real time.

FIG. 5 is an example of a factory vector 570 in which a variety of data concerning the industrial site and all of its loads is logged in real time. As mentioned earlier, factory vector 570 includes sensor vector 582, operational planning data vector 584 and external sensor vector 586. This data is logged during the same time intervals as used in the status vector and thus reflects a particular state of the site (or of a particular load) when a load is on or off. Sensors A, B, C and D are internal sensors that log data for a particular load or loads. Typically, sensors 582 will include a wide variety of sensors logging data for each of the loads. For example, sensors A and B may measure data at Load 1, while sensors C and D may measure data at Load 2. Sensors 582 may also measure aspects of the process as a whole rather than in relation to any given load (e.g., temperature in a cold store with four compressors). There may be any number of internal sensors and each load may have any number of sensors. Data measured by the sensors at each load include temperature, pressure, current, voltage, buffer tank levels (%), product quality indicators, product volume rates (per minute, per hour), etc.

Operational planning data 584 includes tons of goods produced per week/day/hour for a process in the factory, types of goods, etc. External sensors 586 measure data external to an industrial site such as outside air temperature, wind speed, cloud cover, luminosity, etc.

Power Relationships and Disaggregation Error

It is realized that the following relationships exist between the various power consumers and producers at a given site:

$$P_{site} = P_{measured} + P_{unmeasured}$$

$$P_{measured} = \sum_{j=1}^{J} P_j^{demand} - \sum_{k=1}^{K} P_k^{production}$$

$$P_{unmeasured} = \sum_{i=1}^{I} P_{targetload\ i} + P_{other}$$

The values of $P_{site}$ and $P_{measured}$ are measured in real time, using for example, site power meter 372 and individual load power meter 374 of FIG. 2 to measure respectively the total power consumed by a particular site and the power consumed by a particular load or loads. Measured values of power for loads or for processes are measured using any power meters that are already installed on particular loads or can be estimated or modeled with enough accuracy such that the power for such a load need not be calculated using the present invention (e.g., using known models for office cooling or lighting). As mentioned, it is not necessary to place meters on individual loads, although some meters may already exist.

For example, it is realized that for certain loads (e.g., an industrial grinder at a cement factory) the rate is continuous and flat, meaning that the power consumed is constant over time. Thus, instead of needing to install an expensive power meter on that load (and to install associated connectivity hardware and software), the power used over time can be modeled accurately enough by multiplying the installed power capacity (or maximum power capacity) by the time the load is on.

Power for a site is positive if the site is using more power than it generates and is negative if the site produces more than it uses. Even though some industrial sites use a great deal of power, some actually generate more power than they use because of micro-production centers, such as a site with large CHP installations (CHB). Even sites that generate net power have an interest in transparency into their power consumption and will benefit from the present invention.

We note that $P_{measured}$ may be split between power consuming loads (i.e., P(demand), including the sum of all measured loads at a site) and power producing equipment (i.e., P(production), including the sum of all power producing equipment), for those sites that also produce power. $P_{unmeasured}$ is split into power consumption of (i) the target loads (those loads for which the present invention will calculate their power consumption), and (ii) other unknown and unmeasured power such as power consumed by an office building on the site. Other unknown sources of power consumption include computers, lighting at local offices, small heating/cooling equipment, etc. It is assumed that $P_{other}$ is either (i) negligible in its contribution to the disaggregation error or (ii) adequately modeled (e.g., using known models of office cooling and calendar fitting). If a part of P(other) is adequately modeled it may be considered part of P(measured) as discussed in the paragraph above.

As explained in more detail below, if it is determined that P(other) is not negligible or cannot be adequately modeled, metering may be added to any loads that make up P(other) in order to effectively move one or more of these loads from $P_{other}$ to $P_{measured}$. Metering may be added to individual loads of P(other) one at a time until P(other) becomes negligible. P(target load) is the power of an individual load or process at the industrial site and whose power will be determined through the invention described.

Thus, a value for P(unmeasured) may be determined for every time interval at a particular site. That is, each of intervals 510-560 (for example) will have its own P(unmeasured) value, and it is this value that will be disaggregated on each time interval as discussed in the below flow diagrams.

We use standard definitions of the performance of our approach by these or similar measures, where the disaggregation error $$\delta = \sqrt{\sum_{i,t} \|y_t^i - \hat{y}_t^i\|^2 \Big/ \sum_{i,t} \|y_t^i\|^2}$$

with $y_t^i$ being the actual measured power of an individual load i at time t, and $\hat{y}_t^i = \hat{y}^i(\Lambda(t))$ being the predicted power of said load i by the model under consideration (another technique is to consider the cost based on the measured power, rather than on the power itself), and where the cross-validated prediction error $\tau = \sum_{K \in \Psi} \sqrt{\sum_{i,k \in K} \|y_t^i - \hat{y}_t^i\|^2}$
with l being the actual measured power of an individual load i, $\hat{y}_t^i(\Lambda)$ being the predicted power of said load i by the model under consideration when trained on all but K, and K being one of N complementary test folds $\Psi$. As mentioned, other error measures and definitions of performance may be used. For purposes of determining these errors in order to check the requirements of steps 648 and 808, for example, one may use inexpensive, temporary power meters. These meters may later be removed, thus obviating the need for expensive, permanent meters that must be connected to expensive hardware and software. In fact, a single temporary meter may be used to measure the power of loads for the purposes of determining these errors.

Various performance requirements have configurable default values but may also be input externally by users of the system per industrial site as a limit on the disaggregation error, and may also be input per load (and model, as explained below) as a limit on the cross-validated training errors (i.e., the mean test error over a set of complementary test folds). Requirements may be input by a plant owner, energy manager, or by an operator of the power metering system. A requirement on the disaggregation error may state that the estimated power for each target load may not be off by more than 5%, for example, and there may be a different requirement for each load. A requirement on the cross-validated prediction error may state that the error of a model for a particular load be below a particular threshold. Also, the performance requirements may be defined over different time periods, over which the disaggregation of energy is required to be precise. For example, an energy manager may decide that he wants to have the disaggregation within 5% precision when total energy is calculated over one day or over one week.

Power Disaggregation Flow Diagrams

Unmeasured power at a particular industrial site is disaggregated in order to determine and predict the power usage of individual loads. Based upon site power measured at a site over time, the status of all loads over time, and other sensor data, techniques shown in the below diagrams are used to increasingly disaggregate the unmeasured power in order to determine and predict the power usage of individual loads. In general, a more accurate, simpler technique is used first, followed by a more complex technique, if needed.

Figure 6A:
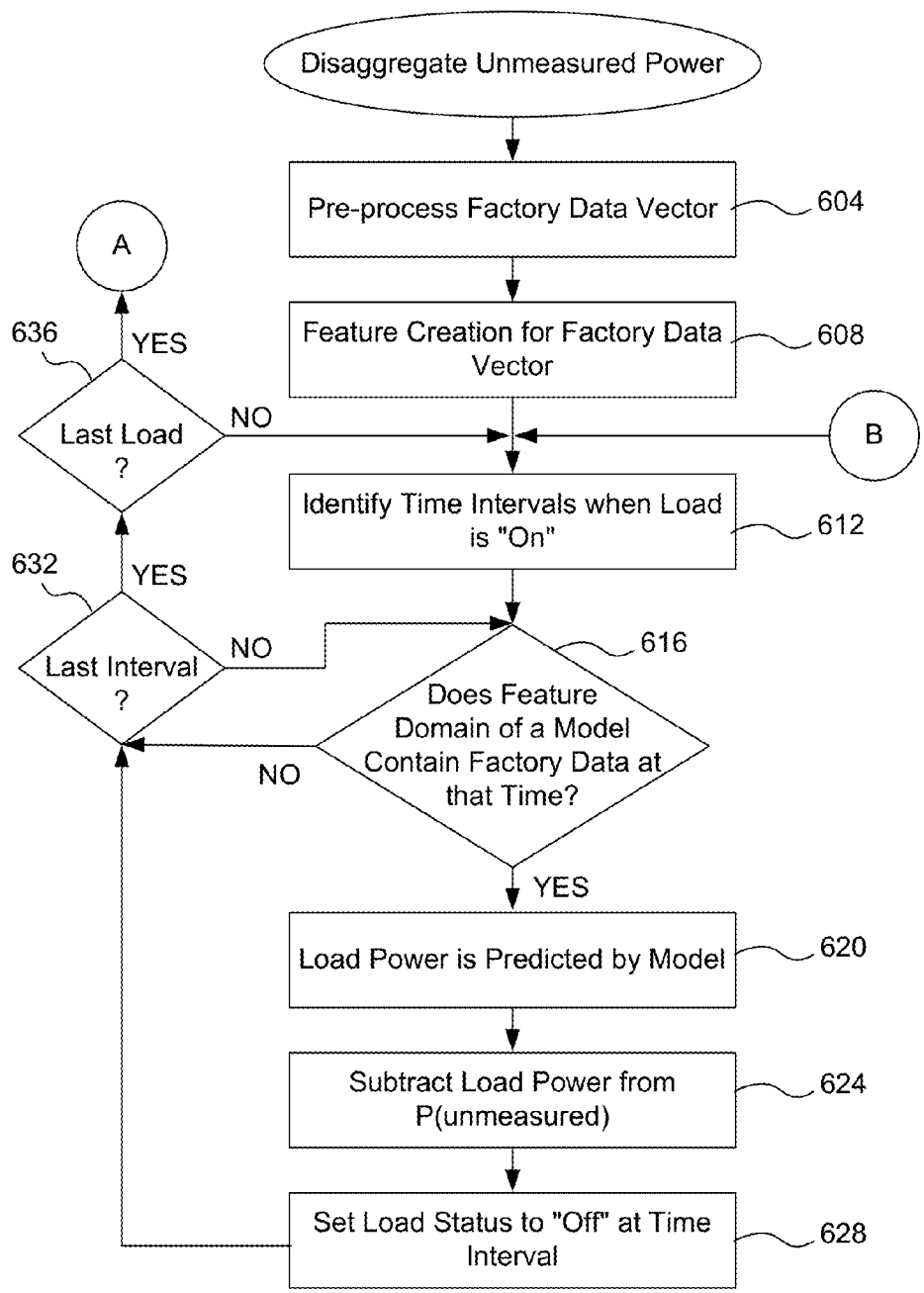
FIG. 6A is a flow diagram describing a first technique by which unmeasured power is disaggregated by first identifying a model that can accurately predict the power usage of a particular load.

FIG. 6A is a flow diagram describing a first technique by which unmeasured power is disaggregated by first identifying a model that can accurately predict the power usage of a particular load. In step 604 the factory data vector is preprocessed before it is used in any of the models. As is known, a variety of preprocessing techniques may be used such as removal of outliers and anomalies, and use of user-configurable rules.

In step 608 feature creation is performed. As discussed above, mathematical models are used to predict a response (a continuous or discrete variable) based upon input features (parameters and values). In this context, a model uses input features to predict the power usage of a particular industrial load. As mentioned, the factory data vector includes a variety of internal sensor data, operational planning data and external sensor data. Typical data input as features to the models are electrical current used by a load or process, or pressure or temperature of a process, etc. In general, a feature is any of this factory data (especially sensor data) applicable to a load or process. Feature creation may be performed based upon which features are most relevant to the target load types in the models, and based upon user input, i.e., factory personnel who understand which factory data are relevant to the power usage of a particular load. Feature creation refers to the general method in statistical learning of making new features out of existing features, in order to realize better model fits. For instance, one may log temperature and pressure (two features), but really the better feature to use might be the multiplication of the two "pxT." Any transformation of the original features to such new features is called feature creation.

Next, for each target load within the industrial site, steps 612-636 are performed. The length of time over which iteration occurs may vary. Typically, a factory may have many years worth of historical data which is used as a training set, although some factories may have stored very little data for use. It is this historical data which is used in steps 612 and 616.

In step 612, using the status vector, a list is made per load, identifying all time intervals during which the target load is "On." As shown in FIG. 4, a list for Load 1 would include time intervals 510 and 560, a list for Load 2 would include intervals 530-560, etc. Steps 616-632 then performed for each of these identified time intervals.

Next, in step 616 it is determined whether a model exists in database 400 for the target load (e.g., Load 1 at 510) such that such that the feature domain of that model includes sensor data during the time interval that is relevant to the target load. For example, assuming that the target load is a screw compressor of type "X," the method consults database 400, identifies row 460, and determines that the feature domain of a particular model A is 10,000 up to 20,000 amps of current. This means that model A is known to work well and predict power accurately within the performance requirements when the input current to the screw compressor is within the specified domain. Thus, if during the time interval the sensor data for the target load includes a value for input current which is within 10,000 to 20,000 amps, then one may feel comfortable in selecting model A as an accurate predictor of power usage for that target load during the current time interval. If the sensor data indicates that input current were greater than 20,000 amps, then model B would be chosen. In addition, a model may be chosen based upon its load characteristics or system parameters as long as the domain of the model includes the relevant sensor data.

If such a model exists in database 400, then in step 620 that particular model is executed using the required feature or features (e.g., current) from the factory data vector during that time interval and produces a predicted load power for the target load during that time interval. Because an accurate load power has now been predicted for the target load, in step 624 that load power is now subtracted from (disaggregated from) the overall unmeasured power of the site during that time interval (i.e., P(unmeasured)(t)→P(unmeasured)(t)−P(load)(t)). Finally, in step 628 the load status for the target load is set to "Off" during the current time interval to indicate that the target load during that time interval has been disaggregated and that the methods of the invention need not attempt to disaggregate that target load during that time interval further. As shown in FIG. 4, for example, the status of Load 1 in the first time interval 510 will be changed from "1" to "0" to indicate that the power for this load has been disaggregated in the first time interval. Control then moves to step 632.

If this is not the last time interval for the current load identified in step 612 then control returns to step 616 in order to process the next time interval for the current load. If, however, in step 616 it is determined that such a model with the correct feature domain for the time interval does not exist, then control also moves to step 632, meaning that for the current load, during the time interval, its power is not disaggregated from the unmeasured power using this first technique. Of course, one of skill will appreciate that step 616 may occur for all identified time intervals at once depending upon how the method is implemented.

If in step 632 it is determined that the last identified time interval has been processed in step 616 for the current target load, then control moves to step 636 to determine whether the last target load of the site has been processed. If not, then control moves to step 612 in order to process the next target load. Accordingly, as accurate models are identified in database 400 for particular load types, the unmeasured power of the site during each time interval becomes more and more disaggregated, the value of the unmeasured power becomes smaller and smaller for particular time intervals, and more load status are set to "Off" in the status factor. The technique of FIG. 6A provides an accurate prediction of power for target loads as it uses models that are known to predict power within the performance requirements. Basically, the technique of FIG. 6A has iterated through the status vector attempting to match known models with operating loads; other iteration techniques may be used, such as iterating over the time intervals one-by-one rather than iterating over the loads first as has been described.

Figure 6B:
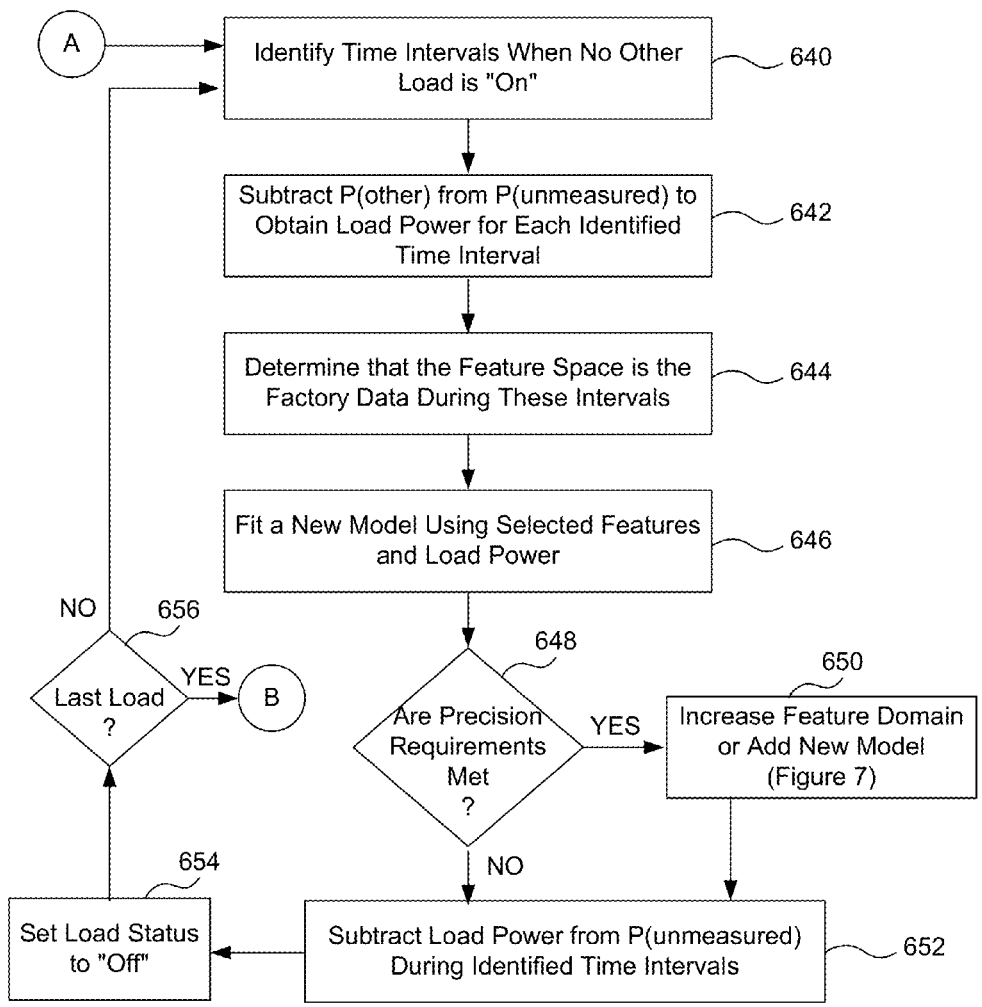

If the last target load of the site has been processed, and no more models are applicable to any operating loads, then control moves to FIG. 6B in order to attempt to disaggregate any remaining loads indicated as still being "On" during any time intervals in the status vector using a second technique. Because not all operating target loads and their features will find a match in database 400 using the first technique (i.e., because a model cannot be found that accurately predicts power), another technique will now be used to disaggregate the remaining unmeasured power.

FIG. 6B is a flow diagram describing a second technique by which unmeasured power is further disaggregated by identifying loads that are on when no other loads are on. By only identifying time intervals in which a single load is on, we may infer the relationship between the logged sensor data and the power that is being used at the site during that time, in order to fit a new model. The new model thus represents the power usage of the single load having particular features.

Accordingly, for each target load within the industrial site, steps 640-656 are performed. In step 640, using the current status vector, a list is made for the target load identifying all time intervals during which the target load is the only load within the site which is "On." As shown in FIG. 4, for example, Load 2 is the only load operating during interval 540, and Load 4 is the only load operating during intervals 510 and 520 (assuming that the power for Load 1 was disaggregated in time interval 510 in the previous flow diagram). Thus, aside from other, miscellaneous power usage, any power usage measured at the site level during these identified time intervals should be the power being used by the target load.

Next, in step 642, in order to estimate the power being used by the target load for each of these identified time intervals, P(other) is subtracted from P(unmeasured) to obtain the target load power for each time interval (i.e., P(load)(t)=P(unmeasured)(t)−P(other)(t)). Note that if an overly strong correlation is observed between any group of loads, dimensional reduction may be performed using principal component analysis (or similar techniques) and the group of loads may be considered as one load. Typically, the threshold of correlation will be set by the precision requirements. For example, for such group loads, after these disaggregation techniques have been used and a disaggregated power amount is obtained for the group of loads, a pro-rata distribution will be made of power consumption based upon the relative capacities of each individual load.

Now that the power usage for the target load has been obtained for each of the identified time intervals in step 644, the feature space is determined to be all of the sensor data logged during one of these identified time intervals. For example, considering Load 4 which is the only load operating during intervals 510 and 520, a sample may be taken using intervals 510 and 520 and the feature space is assumed to be all of the sensor data from those intervals as shown in FIG. 5. In a preferred embodiment, the sensor data from all time intervals during which all other loads are "Off" (or have which have previously been disaggregated) is chosen as a sample. It is possible to use only sensor data from only a single interval, but it may be more difficult to fit a new model that is accurate. Now that we have the feature space, we attempt to predict the known target load power (the response) by fitting an appropriate model.

In step 646, we fit a new model based upon those features selected from the feature space which are most relevant to predicting power. A new model may be fit using different techniques. One technique uses two separate steps, first using a feature selection method (such as Lasso, Lars or other in case of regression), and then selecting a model to train. Another technique combines these two steps in order to select a new model (e.g., using the random forests method where implicit feature selection is performed). A new model may be selected using standard model selection and validation techniques such as Mallow's Cp, Akaika or Bayesian information criterion, adjusted R2, cross validation etc. The result is a new model that may accurately predict the power usage of the target load using the selected features.

Next, in step 648 it is determined whether the selected new model meets the aforementioned precision requirements. In one embodiment, the cross-validated prediction error is calculated and then compared with the precision requirements. If the precision requirements are not met, this indicates that is not possible to select a new model that accurately predicts power usage of the target load during the identified time intervals with the determined feature space. Accordingly, control then moves to step 652; even though a model was not selected, the load power is known for each interval, and the load power will still be subtracted from (disaggregated from) the unmeasured power and the load status set to "Off" for all of the identified time intervals, i.e., P(unmeasured)(t)→P(unmeasured)(t)−P(load)(t)). In this situation, power is disaggregated but no model has been fit.

Alternatively, using a different design, if the precision requirements are not met in step 648, control then moves immediately to step 656. The load power is not subtracted and the load status is not set to "Off" for the identified time intervals. The next load will be processed, though, after step 656. This means that eventually the loop of FIG. 6B will terminate and control will move again to FIG. 6A. It is possible that a global model will have been added to database 400 and that a model can be found that meets the precision requirements. Or, it is possible that the next time FIG. 6B executes it will iterate over the identified time intervals mentioned above (for which no model could be fit earlier) and that an accurate model will be fit this time around. For instance, the next time FIG. 6B executes, the time interval in which the load in question is "On" may have been extended (as other loads around the interval have been disaggregated in the algorithm), which causes (i) an increased training set and (ii) higher accuracy. For illustration, consider a linear model being fitted on a one-minute domain of features and power and precision requirements not being met. If then this domain is extended to two minutes, a new linear regression is done and the model now does meet the requirements, then power can be disaggregated and this model can be added as global model.

Using the original loads of intervals t1 and t2 of FIG. 4 as an example, assume that Load 4 cannot be disaggregated on t2 because the requirements are not met. Now assume that in a later iteration Load 1 can be disaggregated from interval t1. That leaves only Load 4 as being "On" during intervals t1 and t2. Thus, the interval (and domain) can be extended to include both t1 and t2, and it is possible that a model will be found that does meet the requirements. Thus, there may be certain cases where it is useful to leave the power in. In these cases, a terminating criterion may be imposed in order to achieve an acceptably quick convergence time of the algorithm.

If the precision requirements are met in step 648, this indicates that the selected model does accurately predict power usage for the target load using the selected features of the feature space. Accordingly, in step 650, it is possible to increase the feature domain of an existing model or to add the new model to the model database as will be explained in greater detail below with reference to FIG. 7. Control then moves to step 652 as described above.

Next, in step 654 the load status for the target load is set to "Off" during the identified time intervals to indicate that the target load during those time intervals has been disaggregated and that the methods of the invention need not attempt to disaggregate that target load during those time intervals further. As shown in FIG. 4, for example, assuming that new models were found for Load 2 in time interval 540, and for Load 4 in time intervals 510 and 520, the status for those loads at those times is now set to "Off."

Because the target load is the only load operating during a time interval in this flow diagram, is it not strictly necessary to subtract the target load power from the unmeasured power during that time interval. The result of the subtraction is likely zero, or P(other). Although, it can help to keep track of what has been disaggregated and to determine P(other).

Finally, in step 656 determines whether the last target load of the site has been processed. If not, then the next load is processed beginning again at step 640. If the last target load of the site has been processed, then control returns to step 612 of FIG. 6A in order to attempt to disaggregate any remaining loads indicated as being "On" during any time intervals in the status vector. Because step 650 may have added new models to database 400 for a particular load type or may have increased the feature domain of an existing model for a particular load type, it is advantageous to loop through the disaggregation flow diagrams again.

For example, considering that a new model may have been added in step 650 for a particular load type that is known to be an accurate predictor of power usage of that load type in a particular feature domain, that new model can now be used to disaggregate power for that particular load type during other time intervals, even if other loads are also on at the same time. And, even if only the feature domain has been increased for a particular model already existing in database 400, it is also advantageous to loop through the flow diagrams again because it may now be possible to disaggregate a particular load because now its features match with the newly increased feature domain of a particular model.

For example, consider a compressor running alone in a particular time interval which has just been disaggregated using the technique of FIG. 6B. Because a new model has been added for this compressor to database 400, it is possible to disaggregate this compressor during other time intervals even if other loads are running Considering Loads 2 and 4, for example, once new models have been found as discussed above, then both of these loads may be disaggregated on interval 530 using the flow of FIG. 6A even though Load 3 is also operating in that interval.

Accordingly, control returns to step 612 of FIG. 6A and the flow will again iterate over each load and all time intervals attempting to find a model in database 400 having a feature domain that matches with the sensor data of this particular load during the time interval. And, because it is possible that further loads will be disaggregated and removed from the status vector during this flow, it is possible that the resulting status vector may indicate that during certain time intervals there is only one load on. Accordingly, it is then also advantageous to iterate over all loads using the flow of FIG. 6B to further disaggregate loads that are on a time interval by themselves. For example, once Loads 2 and 4 have been disaggregated on interval 530 as mentioned above, then the Load 3 may be disaggregated using the flow of FIG. 6B.

Various efficiencies may be introduced and these flow diagrams may be modified accordingly. For example, because it is known in step 650 precisely which models have been added to database 400 (or which feature domains have been increased), it is not strictly necessary to iterate over each and every load in FIG. 6A. For example, if it is known that a new model was only added for Load 4 and that the feature domain was only increased for Load 5 in step 650, is only necessary to consider these two loads when performing the iteration of FIG. 6A.

Accordingly, the flows of FIGS. 6A and 6B continue iterating until they do not yield any further power reductions in the time intervals. Or, iteration may be repeated until in step 640 no time intervals are identified in which only a single load is on. Or, if after the flow of FIG. 6B has been completed and it is determined that no new models have been added to database 400 and that no feature domains have increased, then it would not be useful to perform the flow of FIG. 6A again because there are no new models and no increased feature domains in that database.

As the unmeasured power is being disaggregated on each interval, or after the iteration has ended, the predicted load power for each load during each time interval may be output, printed, displayed, stored to a database, etc., for analysis or action by the energy manager. This output may also occur after FIG. 8 below.

At this point, for each load of a site we have obtained a mapping from certain domains in the total possible feature space to models which have been tested to perform according to the precision requirements. The union of these domains for a particular load is the total domain of data on which we know that a power model is available for that load that meets the precision requirements. While there may not be a model for every load, nor may the entire possible domain of a load be modeled, further steps may be taken to improve prediction and to reduce error as discussed in FIG. 8 below.

Global Load Models

As mentioned above, as load models are tested and trained at a particular industrial site, and proven to be accurate (or at least within the performance requirements), these load models may be identified and stored at the central site 160 for use at other industrial sites in order to maximize the overall self-learning capability of the system. Individual load models are also improved by increasing the applicable feature domain of a stored load model.

Figure 7:
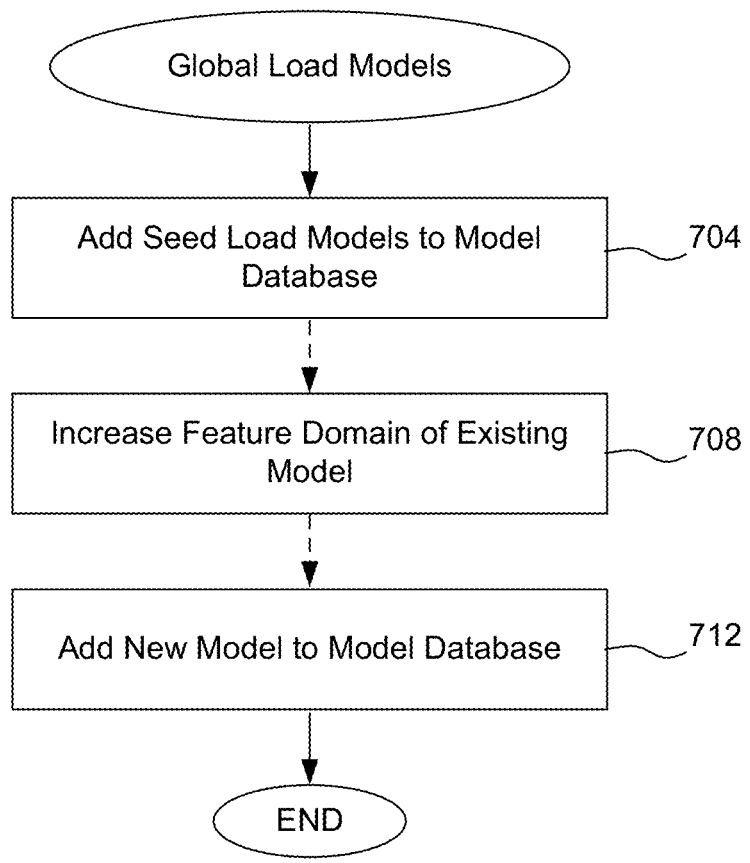
FIG. 7 is a flow diagram describing how global load models are managed.

FIG. 7 is a flow diagram describing how these global (or "meta-") load models are managed. Initially, in step 704 a first "seed" set of loads and associated global load models are added to the database 168 at the central computing unit. These are load models that are known to accurately predict the power usage for a particular load within a particular feature domain. This first set of loads and associated load models may be obtained from factories where full metering equipment and sensor data are accessible (so there is no need for disaggregation). For example, rows 460 and 462 may be present in the model database before iteration begins.

A new model and associated load type and feature domain may also be added to database 400 when step 650 executes as described above. And, the feature domain for an existing model in database 400 may also be increased in step 650. As this new information is added to database 400 in steps 708 and 712 it is then available for use during execution of the above flow diagram in step 616, for example.

In step 708, based upon input from step 650 the existing feature domain in column 444 is increased for an existing model. For example, consider the load type screw compressor of row 460. Should it be determined in the course of FIG. 6B that existing Model A also is an accurate predictor of power usage for that compressor when the input is anywhere from 5,000 to 10,000 amps, then the domain for model A be increased to 5,000 to 20,000 amps.

The feature domain may also be increased based upon a new model found in step 646. For example, assume a new model is found in step 646 that predicts compressor power very well based on current measurement, and one is confident of the model's accuracy for current between 10 and 500 Amps (given certain load and system characteristics). If the existing model for this load only is accurate for a domain of between 500 and 1000 Amps, then one may increase the feature domain from (I, [500, 1000 Amps]) to (I, [10, 1000 Amps]) by storing and using the new model as well. Alternatively if one has found a good model for this load using a temperature measurement (as opposed to a current measurement), say T within [−20,−15 C], then one may increase the feature domain from (I, [500, 1000 Amps]) to (I, [500,1000 Amps]; T, [−20,−15 C]), again, by using the new model. Thus, increasing the feature domain is not limited to extending a range of a currently used feature, other features may also be used in other models.

In step 712, based upon input from step 650 a new model may be added to database 400. Once a new model has been selected in step 646 and approved in step 648, then the model may be added to the database along with: the load type for which it accurately predicts power, the selected features used in step 646 to select that model, the feature domain, and any other load characteristics or system parameters if applicable. As new industrial sites are connected to the power metering system, and power is disaggregated as per the above flow diagrams, new models may be added to the global model database or the feature space domain may be increased as discussed above.

Adding a new model to this database has a distinct advantage. For example, consider a compressor XYZ at a site ABC for which the relationship between input current and power usage is known and has been modeled using a model M. This is a model that may have been created, trained and refined at site ABC, or may be a model that has been developed elsewhere. If a site DEF exists also having the same type compressor XYZ, but only input current is known, the relationship and model M from site ABC may be used at site DEF in order to correctly model the compressor at site DEF and to predict its power usage, assuming that the input current at site DEF is within the feature domain of the model M. In general, if it is known that compressor XYZ is well modeled in a regime (a particular feature domain) by model M, then this model may be used for any other compressor XYZ for that regime at any other site.

Address Disaggregation Error

Figure 8:
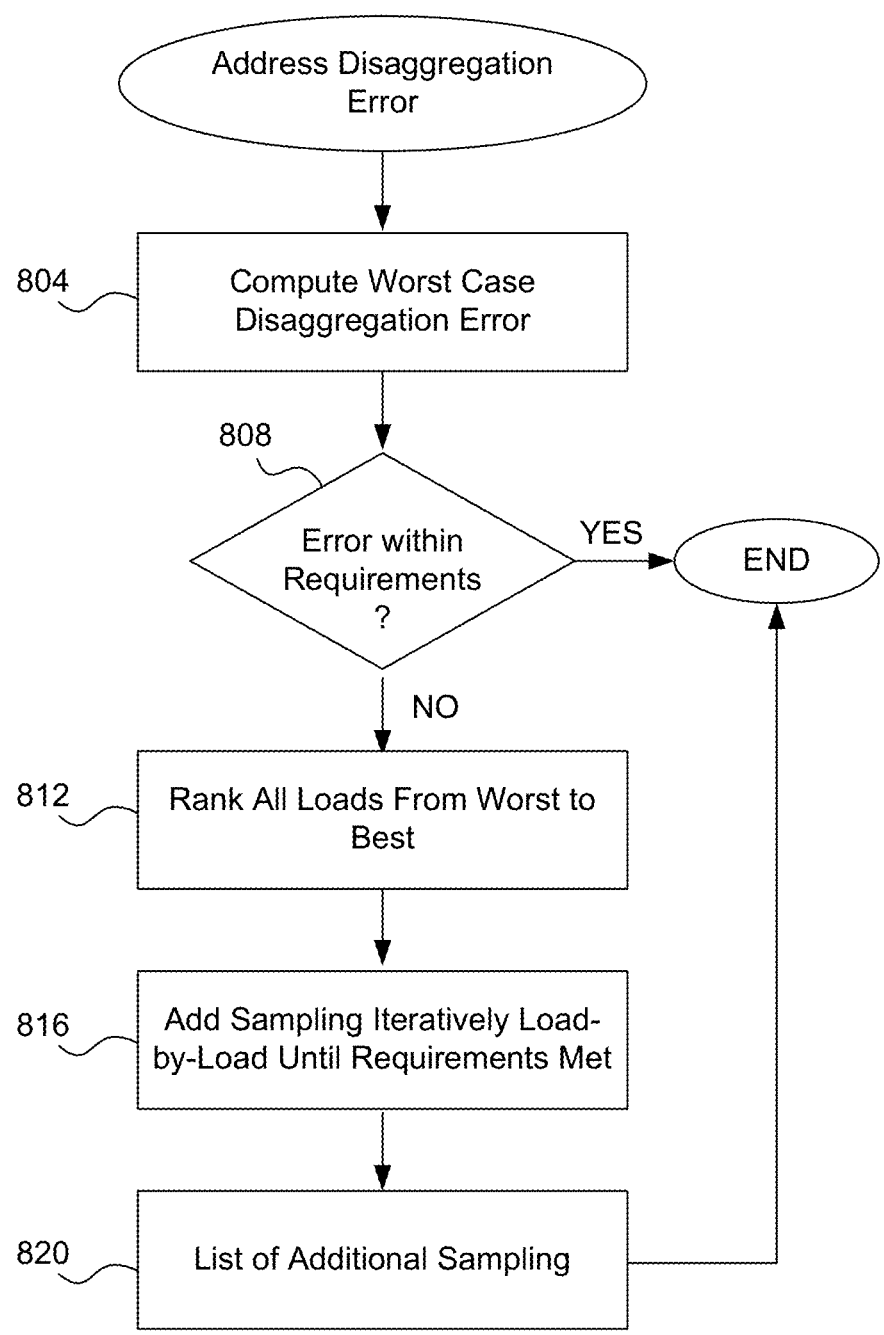
FIG. 8 is a flow diagram describing how the disaggregation error may be addressed.

FIG. 8 is a flow diagram describing how the disaggregation error may be addressed once iteration over the various loads of an industrial site has completed. In step 804 a worst-case disaggregation error is computed for the entire site using the disaggregation formula above.

If, in step 808, the computed error is within the precision requirements of the site then the flow ends. If not, then control moves to step 812. In step 812 a sampling priority is determined. All loads are ranked from worst to best based upon either (i) their relative contribution to the disaggregation error, or (ii) the length of the total "un-modeled" domain during which the load is operating but no model is available. Next, in step 816, sampling is added iteratively load-by-load (starting with the worst load) until the disaggregation errors are within the precision requirements. For example, additional, permanent power meters may be installed upon certain loads, or, additional sensors may be installed (in order to enable usage of any of the global models using the sensor data), whichever is most economical or practical. The additional power meters are only those strictly necessary to reduce the error to be within the precision requirements.

In step 820 a list of necessary additional sampling is made. Based on results from this flow, one determines which new sensors or metering (sensor data sensors or load power metering) are necessary in order to fully disaggregate the power of the factory according to requirements. For instance, if just one load is left to disaggregate, one just needs power metering on that one load to conclude. If one has two compressors left in one cold store, but no temperature data in the cold store, one only needs the temperature sensor data. The general approach is to look at the global models, compare these to the load/system at hand, and determine what minimal set of sensors/sampling is needed to disaggregate the load.

When the required disaggregation errors is met, the power data for each load obtained via the above disaggregation techniques may be combined with knowledge of the site energy supply contract (or the energy production contract as the case may be) in order to provide a real-time view on the energy costs per load. Note that the accuracy of the power disaggregation may also be defined in terms of power cost rather than the power itself. And, even though the above description refers to the power used by a particular load, one of skill in the art can easily determine energy used by knowing the time interval over which the power is used.

Residential Site Example

Figure 9:
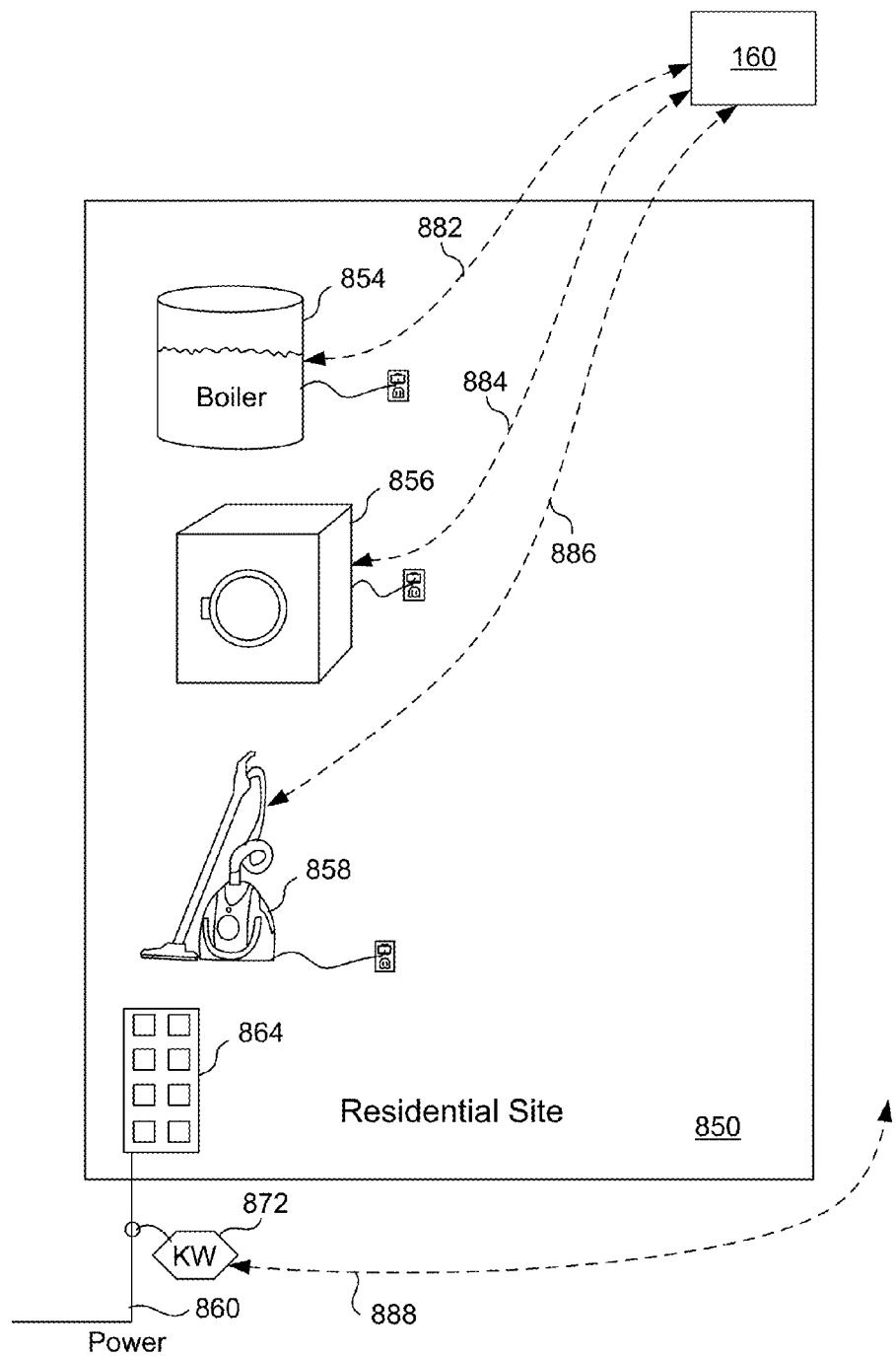
FIG. 9 illustrates an example residential site according to another embodiment of the invention.

FIG. 9 illustrates an example residential household site 850 according to one embodiment of the invention. Included within this site are any number of household appliances such as an electric boiler 854, a washing/drying machine 856, a vacuum 858, and others not shown such as dishwashers, refrigerator, kitchen robots, televisions, computers, batteries, solar panels, heat pumps, heating elements, etc., each being connected to electrical power. Power 860 is obtained from (or delivered to) the local distribution grid and feeds a household power distribution panel 864. A site power meter (or head meter) 872 measures the power used by the entire residential site and all of its loads, and may also measure power produced by the site.

Each household appliance may be connected 882-886 to computing unit 160 over a wireless low-frequency range network, e.g., in the 868 MHz band (such as the SigFox network), allowing an exchange of short messages and instructions. The power meter 872 (which may be a temporary meter) also has a connection 888 to computing unit 160 so that the main power signal is measured. The network logs the "on/off" signals of the appliances and also receives sensor data from the appliances, thus the same type of data is available as at an industrial site, and hence the above-described invention can work in the same way as at an industrial site. The data logged at site 850 may include temperature (through internal thermostat readings and external temperature data), voltage/current (from power meter), state of charge (boiler/battery), etc. Global models may be built in the same way as before. Site 850 may also include a computer 320 (or other suitable hardware) in order to communicate with each appliance and with computing unit 160 over an Internet connection, such as shown in the example of FIG. 2.

Additional Embodiments

The present invention includes additional embodiments which are listed below.

One embodiment is an apparatus for disaggregating power of a site, said apparatus comprising: a plurality of loads operating at said site during a plurality of time intervals; a first computer having a database of models that each predict power used by one of said loads during at least one of said time intervals; and a second computer arranged to identify a model in said database that predicts power used by one of said loads during one of said time intervals, subtract said predicted power from a running total of unmeasured power used by said site during said time interval and indicate that said one of said loads is not operating during said time interval, determine power used by one of said loads during one of said time intervals when no other loads are operating or are indicated as operating; fit a new model using said determined power and storing said new model in said database, and output said predicted power and said determined power.

Another embodiment is an apparatus for disaggregating power at a plurality of sites, said apparatus comprising: a first load operating at a first site during a first time interval when only said first load is operating; a second load operating at a second site different from said first site and being of the same type as said first load operating at said first site; and a computer arranged to determine a first load power used during said first time interval by said first load, fit a model using selected sensor data of said first site during said first time interval and said determined first load power, determine a second load power used during a second time interval by said second load using said model, and outputting said determined second load power.

Computer System Embodiment

Figure 10A:
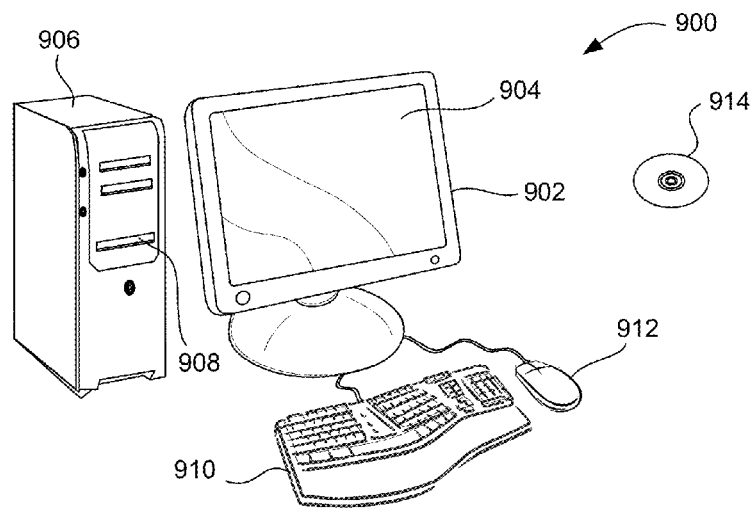
FIGS. 10A and 10B illustrate a computer system suitable for implementing embodiments of the present invention.
Figure 10B:
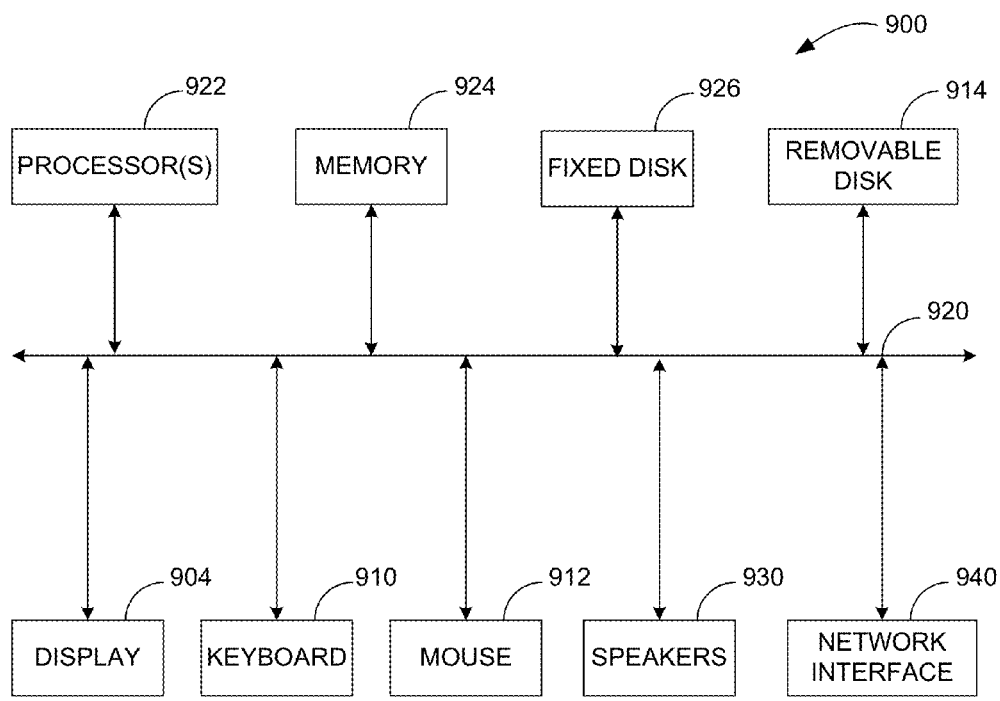

FIGS. 10A and 10B illustrate a computer system 900 suitable for implementing embodiments of the present invention. FIG. 910 shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 10B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of addressing disaggregation error at a site, said method comprising:
    computing a disaggregation error of a plurality of loads over a plurality of time intervals at said site, said computing using measured power of said loads and predicted power of said loads, said measured power being measured using temporary power meters;
    determining that said disaggregation error is not within a requirement of said site;
    ranking said loads based upon a length of time during which each of said loads is operating and no power model is available for said each of said loads;
    adding a permanent power meter to a worst load of said ranking having a longest time of said ranking; and
    measuring a power of said worst load using said added permanent power meter, whereby said disaggregation error is reduced.

2. A method as recited in claim 1 further comprising:
    performing said step of adding a permanent power meter iteratively load-by-load until said disaggregation error is within said requirements of said site.

3. A method as recited in claim 1 further comprising:
    iterating over said plurality of loads and disaggregating power of said site in order to predict power of said loads over said time intervals, said iterating occurring before said computing.

4. A method as recited in claim 1 wherein said computing uses a cost based upon said measured power of said loads and a cost based upon said predicted power of said loads.

5. A method of addressing disaggregation error at a site, said method comprising:
    computing a disaggregation error of a plurality of loads over a plurality of time intervals at said site, said computing using measured power of said loads and predicted power of said loads, said measured power being measured using temporary power meters;
    determining that said disaggregation error is not within a requirement of said site;
    ranking said loads based upon a length of time during which each of said loads is operating and no power model is available for said each of said loads;
    adding a data sensor to a worst load of said ranking having a longest time of said ranking; and
    predicting a power of said worst load using a power model that uses input from said data sensor, whereby said disaggregation error is reduced.

6. A method as recited in claim 5 further comprising:
    performing said step of adding a data sensor iteratively load-by-load until said disaggregation error is within said requirement of said site.

7. A method as recited in claim 5 further comprising:
    iterating over said plurality of loads and disaggregating power of said site in order to predict power of said loads over said time intervals, said iterating occurring before said computing.

8. A method as recited in claim 5 wherein said computing uses a cost based upon said measured power of said loads and a cost based upon said predicted power of said loads.

9. A method as recited in claim 5 further comprising:
predicting said power by increasing a feature domain of said power model to utilize data input from said data sensor.

10. An apparatus for addressing disaggregation error at a site, said apparatus comprising:
a plurality of loads operating at said site;
a computer arranged to
compute a disaggregation error of said loads over a plurality of time intervals using measured power of said loads and predicted power of said loads, said measured power being measured using temporary power meters,
determine that said disaggregation error is not within a requirement of said site, and
rank said loads based upon a length of time during which each of said loads is operating and no power model is available for said each of said loads; and
a permanent power meter added to a worst load of said ranking having a longest time of said ranking, said permanent power meter arranged to measure a power of said worst load, whereby said disaggregation error is reduced.

11. An apparatus for addressing disaggregation error at a site, said apparatus comprising:
a plurality of loads operating at said site;
a computer arranged to
compute a disaggregation error of said loads over a plurality of time intervals using measured power of said loads and predicted power of said loads, said measured power being measured using temporary power meters,
determine that said disaggregation error is not within a requirement of said site, and
rank said loads based upon a length of time during which each of said loads is operating and no power model is available for said each of said loads; and
a data sensor added to a worst load of said ranking having a longest time of said ranking, said data sensor arranged to input data to a power model that predicts power of said worst load, whereby said disaggregation error is reduced.

* * * * *